(12) United States Patent
Schessler et al.

(10) Patent No.: US 10,836,223 B1
(45) Date of Patent: Nov. 17, 2020

(54) ENCAPSULATED EMBEDDED TIRE SENSOR UNIT

(71) Applicant: The Goodyear Tire & Rubber Company, Akron, OH (US)

(72) Inventors: Gregory Alan Schessler, Stow, OH (US); Todd James Spencer, Hartville, OH (US); Benjamin John Iverson, Canton, OH (US); Ryan Michael Schmidt, Wadsworth, OH (US); Benjamin Isaiah Garn, Norton, OH (US); Carl Trevor Ross Pulford, Akron, OH (US); Xiaoping Yang, Streetsboro, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/716,931

(22) Filed: Dec. 17, 2019

(51) Int. Cl.
 *B60C 23/04* (2006.01)

(52) U.S. Cl.
 CPC ...... *B60C 23/0493* (2013.01); *B60C 23/0452* (2013.01)

(58) Field of Classification Search
 None
 See application file for complete search history.

(56) References Cited

U.S. PATENT DOCUMENTS

| | | |
|---|---|---|
| 5,500,065 A | 3/1996 | Koch et al. |
| 5,573,610 A | 11/1996 | Koch et al. |
| 6,255,940 B1 | 7/2001 | Phelan et al. |
| 6,534,711 B1 | 3/2003 | Pollack |
| 6,630,885 B2 | 10/2003 | Hardman et al. |
| 6,637,276 B2 | 10/2003 | Adderton et al. |
| 6,668,884 B2 | 12/2003 | Koch et al. |
| 6,732,590 B1 | 5/2004 | Gottlieb et al. |
| 6,788,192 B2 | 9/2004 | Shimura |
| 6,807,853 B2 | 10/2004 | Adamson et al. |
| 6,868,717 B2 | 3/2005 | Koch et al. |
| 6,885,291 B1 | 4/2005 | Pollack et al. |
| 6,951,143 B1 | 10/2005 | Adderton et al. |
| 7,040,154 B2 | 5/2006 | Shaw et al. |
| 7,132,930 B2 | 11/2006 | Wilson et al. |
| 7,161,476 B2 | 1/2007 | Hardman et al. |
| 7,172,130 B2 * | 2/2007 | Tsunoda ........... G06K 19/07728 235/492 |
| 7,196,637 B2 | 3/2007 | Sabet et al. |
| 7,343,787 B2 | 3/2008 | Oflaz |
| 7,592,902 B2 | 9/2009 | Wilson et al. |
| 7,598,877 B2 | 10/2009 | Lionetti |
| 7,679,570 B2 | 3/2010 | Leymin et al. |
| 7,900,666 B2 | 3/2011 | Bell |
| 8,051,705 B2 | 11/2011 | Kobayakawa |
| 8,365,590 B2 | 2/2013 | Yu et al. |
| 8,373,551 B2 | 2/2013 | Laird et al. |
| 8,685,527 B2 | 4/2014 | Cubizolle et al. |

(Continued)

*Primary Examiner* — Carlos Garcia

(74) *Attorney, Agent, or Firm* — Edward T. Kennedy

(57) ABSTRACT

An encapsulated sensor unit is embedded in a tire. The encapsulated sensor unit includes a sensor portion and an antenna portion. A first encapsulating layer is disposed about the sensor portion, and not about the antenna portion. A second encapsulating layer is disposed about the first encapsulating layer and the antenna portion. A third encapsulating layer is disposed about the second encapsulating layer.

19 Claims, 5 Drawing Sheets

(56) References Cited

U.S. PATENT DOCUMENTS

| | | |
|---|---|---|
| 8,686,550 B2 | 4/2014 | McDonald et al. |
| 8,776,590 B2 | 7/2014 | Kempf et al. |
| 9,146,170 B2 | 9/2015 | Wen et al. |
| 9,623,591 B2 | 4/2017 | Colwell et al. |
| 2004/0263324 A1* | 12/2004 | Sanchez ............ B60C 23/0408 340/442 |
| 2005/0093761 A1* | 5/2005 | King ................ H01Q 1/2241 343/873 |
| 2017/0245797 A1* | 8/2017 | Quinn ................ A61B 5/002 |
| 2018/0267584 A1* | 9/2018 | Wodrich ............ H01F 38/14 |

* cited by examiner

ENCAPSULATED EMBEDDED TIRE SENSOR UNIT

FIELD OF THE INVENTION

The invention relates to tires and monitoring systems for tires. More particularly, the invention relates to electronic sensors that sense various conditions within tires. Specifically, the invention is directed to a sensor unit that is encapsulated for embedding in a tire structure.

BACKGROUND OF THE INVENTION

Tires experience many conditions that are beneficial to monitor. Such tires include pneumatic tires, non-pneumatic tires, automotive tires, passenger tires, truck tires, commercial tires, off-the-road tires, aircraft tires, spacecraft tires, and the like. Reference herein is made generally to a tire by way of example, with the understanding that the invention applies to any type of tire.

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic sensor units to the tires either before or after curing. Such sensor units enable temperature, pressure and/or other parameters or conditions of the tire to be continuously monitored during vehicle operation. The sensor units typically include an integrated circuit that processes and stores information. One or more sensors are integrated with or are electronically connected to the integrated circuit. An antenna for receiving and transmitting a signal to an external reader is also electronically connected to the integrated circuit, and may be carried on a substrate with the integrated circuit. Other electronic components, including power means such as a battery or energy harvesting structure, signal converters, and the like, are also typically integrated with the integrated circuit.

In the prior art, such electronic sensor units have often been attached to the inside surface of a pneumatic tire, which defines the cavity containing the inflation gas. Such a location has enabled the sensor unit to continuously sense parameters such as the temperature and pressure inside the tire cavity, while not interfering with the structure of the tire.

While such prior art sensor units are acceptable for many uses, it is desirable to monitor the actual temperature and other parameters at specific locations inside the tire structure during use on a vehicle, which cavity-based sensors cannot do. For example, monitoring the actual temperature at the edge of the belts in the belt package would be advantageous in predicting ongoing tire performance and potential tire replacement, as well as in providing immediate information to a driver or dispatcher to adjust the speed of a vehicle before potential thermal damage to the tire may occur. However, accurate measurement of the actual temperature at such a location requires the sensor unit to be permanently embedded into the tire structure.

In addition, as the demand for monitoring data increases, the size of the components of the sensor unit has often increased. For example, the sensor size has often increased in order to collect more data and/or monitor parameters with a greater sensitivity, power-related component size has increased due to increased power requirements for increased monitoring and transmission, and input/output component size has increased due to increased transmission timing and/or range.

Prior art embedded sensor units have experienced disadvantages, particularly with such increased component size requirements. More particularly, prior art sensor units have not been able to withstand tire curing conditions or tire operating conditions. For example, prior art sensor units have undesirably experienced detachment or cracking of components and/or the substrate during curing or operation of the tire, which shortens the life of the sensor unit.

As a result, it is desirable to develop a sensor unit with a structure that enables the unit to be embedded in a tire structure, which maintains durability of the tire and the life of the sensor unit.

SUMMARY OF THE INVENTION

According to an aspect of an exemplary embodiment of the invention, an encapsulated sensor unit for embedding in a tire includes a sensor portion and an antenna portion. A first encapsulating layer is disposed about the sensor portion, and a second encapsulating layer is disposed about the first encapsulating layer and the antenna portion. A third encapsulating layer is disposed about the second encapsulating layer.

According to another aspect of an exemplary embodiment of the invention, a tire includes an encapsulated sensor unit. The tire and encapsulated sensor unit combination includes a tire, which in turn includes a pair of bead areas, a sidewall extending from each respective bead area to a tread, a carcass extending toroidally between each of the bead areas, and a belt reinforcement package disposed between the tread and the carcass. An encapsulated sensor unit is embedded in the tire. The encapsulated sensor unit includes a sensor portion and an antenna portion. A first encapsulating layer is disposed about the sensor portion, and a second encapsulating layer is disposed about the first encapsulating layer and the antenna portion. A third encapsulating layer is disposed about the second encapsulating layer.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Crown" means the section of the tread area between the shoulders of the tire.

"Equatorial plane (EP)" means the plane perpendicular to the tire's axis of rotation and passing through the center of its tread.

"Footprint" means the contact patch or area of contact created by the tire tread with a flat surface as the tire rotates or rolls.

"Groove" means an elongated void area in a tread that may extend in a circumferential, lateral or angled manner about the tread in a straight, curved, or zigzag configuration.

"Inboard side" means the side of the tire nearest the vehicle when the tire is mounted on a wheel and the wheel is mounted on the vehicle.

"Inner" means toward the inside of the tire.

"Innerliner" means the layer or layers of elastomer or other material that form the inside surface of a tubeless tire and that contain the inflating fluid within the tire.

"Lateral" and "laterally" are used to indicate axial directions across the tread of the tire.

"Outboard side" means the side of the tire farthest away from the vehicle when the tire is mounted on a wheel and the wheel is mounted on the vehicle.

"Outer" means toward the outside of the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Shoulder" means the region of the exterior of the tire formed by the joining of the tread and a sidewall.

"Tread" means a molded rubber component which includes that portion of the tire that comes into contact with the road when the tire is normally inflated and under normal load. The tread has a depth conventionally measured from the tread outer surface to the bottom of the deepest groove of the tire.

"Tread block" or "Tread element" means a rib or a block element defined by a shape having adjacent grooves.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
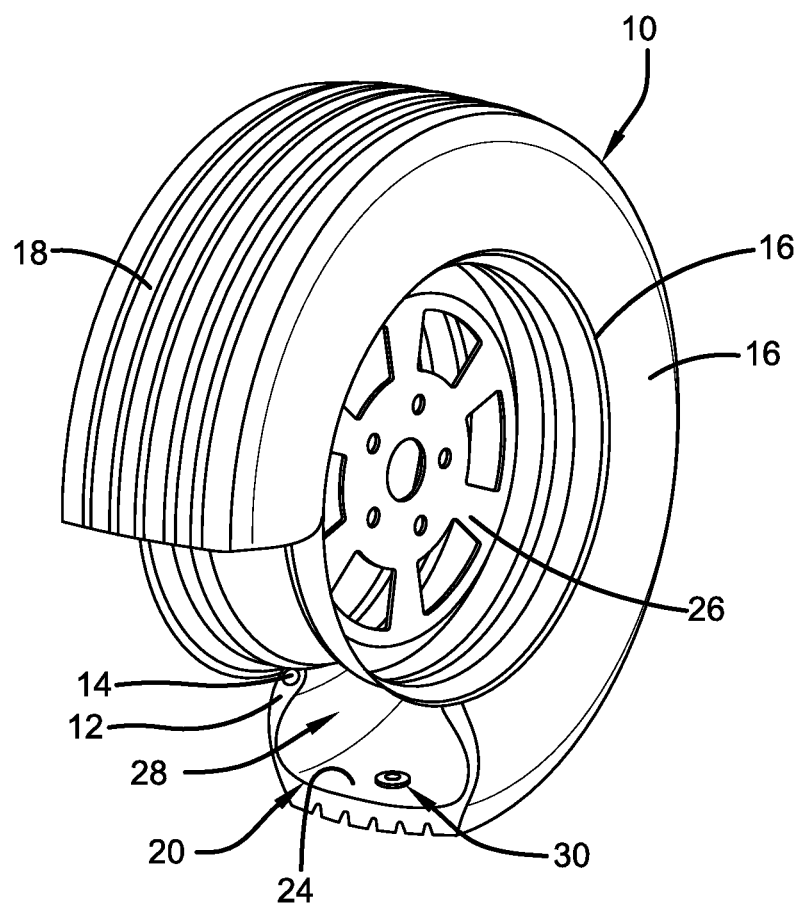
FIG. 1 is a perspective view of a tire, partially in section, with a cavity-mounted sensor unit of the prior art.

By way of introduction of the encapsulated sensor unit for a tire of the present invention, FIGS. 1 through 4 show a sensor construction of the prior art and a tire. Turning to FIG. 1, a tire 10 includes a pair of bead areas 12 (only one shown) and a bead core 14 embedded in each bead area. Each one of a pair of sidewalls 16 extends radially outward from a respective bead area 12 to a ground-contacting or ground-engaging tread 18. The tire 10 is reinforced by a carcass 20 that toroidally extends from one bead area 12 to the other bead area. The carcass 20 includes at least one ply 22 that preferably winds around each bead core 14. An innerliner 24 is formed on the inner or inside surface of the carcass 20. The tire 10 is mounted on the flange of a wheel or rim 26, as known in the art.

When the tire 10 is mounted on the wheel 26, a cavity 28 is formed and is filled with a pressurized fluid, such as air. An integrated sensor, such as a tire pressure monitoring system (TPMS) sensor unit 30, may be mounted on the innerliner 24 to measure the pressure and/or temperature in the cavity 28.

Figure 2:
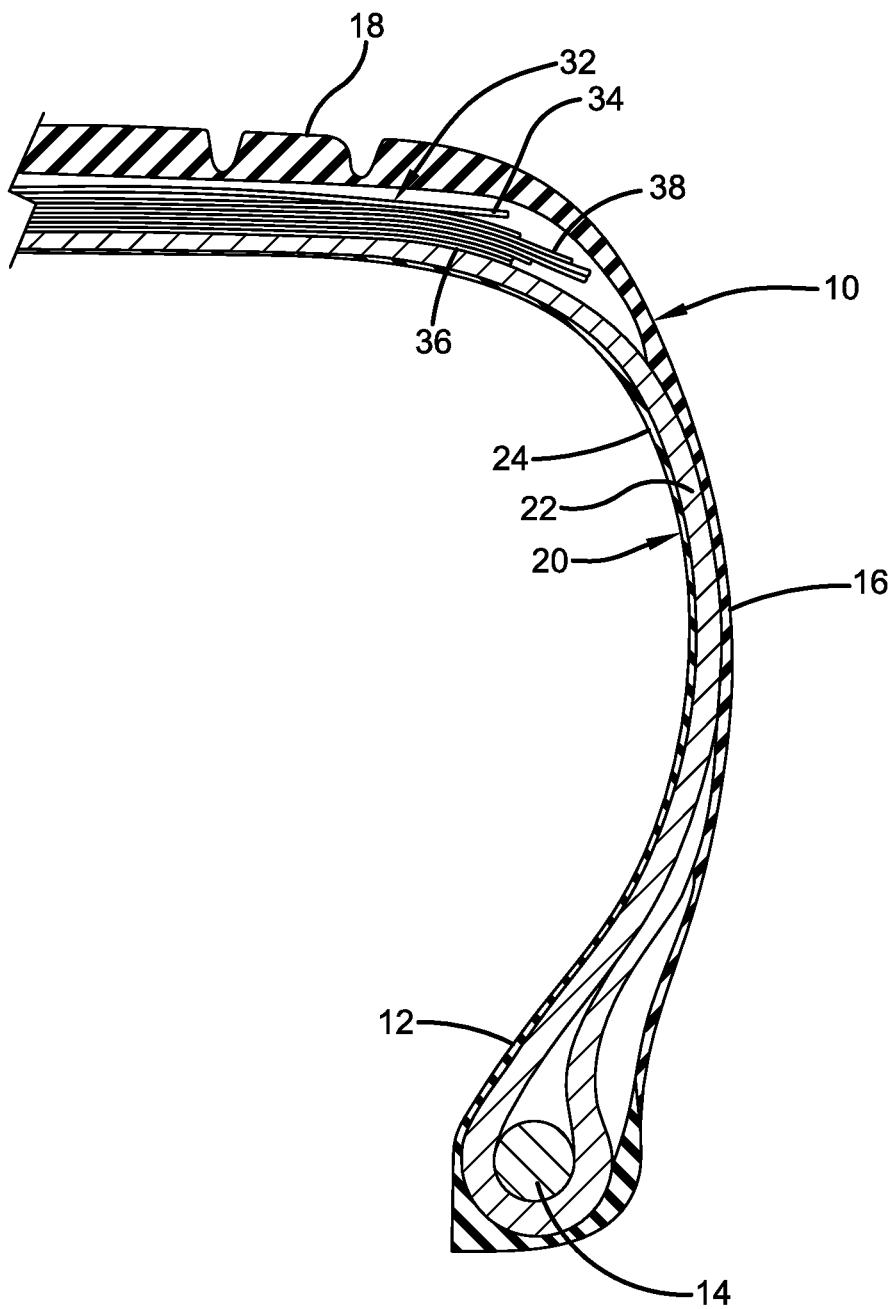
FIG. 2 is a partial cross-sectional view of the construction of the tire shown in FIG. 1.

As shown in FIG. 2, a belt reinforcement package 32 is disposed between the carcass 20 and the tread 18. The belt reinforcement package 32 may employ specific configurations as desired. For example, the belt reinforcement package 32 may include at least one of a radially outer belt structure 34 and a radially inner belt structure 36, and an intermediate belt structure 38 disposed between the radially outer belt structure and the radially inner belt structure.

As mentioned above, in the prior art, the integrated TPMS sensor unit 30 has been attached to the innerliner 24, which enables the sensor to continuously sense parameters such as the temperature and pressure inside the tire cavity 28, while not interfering with the structure of the tire 10. However, the TPMS sensor unit 30 cannot monitor the actual temperature and other parameters at specific structural locations inside the tire 10 during use on a vehicle, such as at the edge of the belt structures 34, 36 and 38 in the belt package 32.

Figure 3:
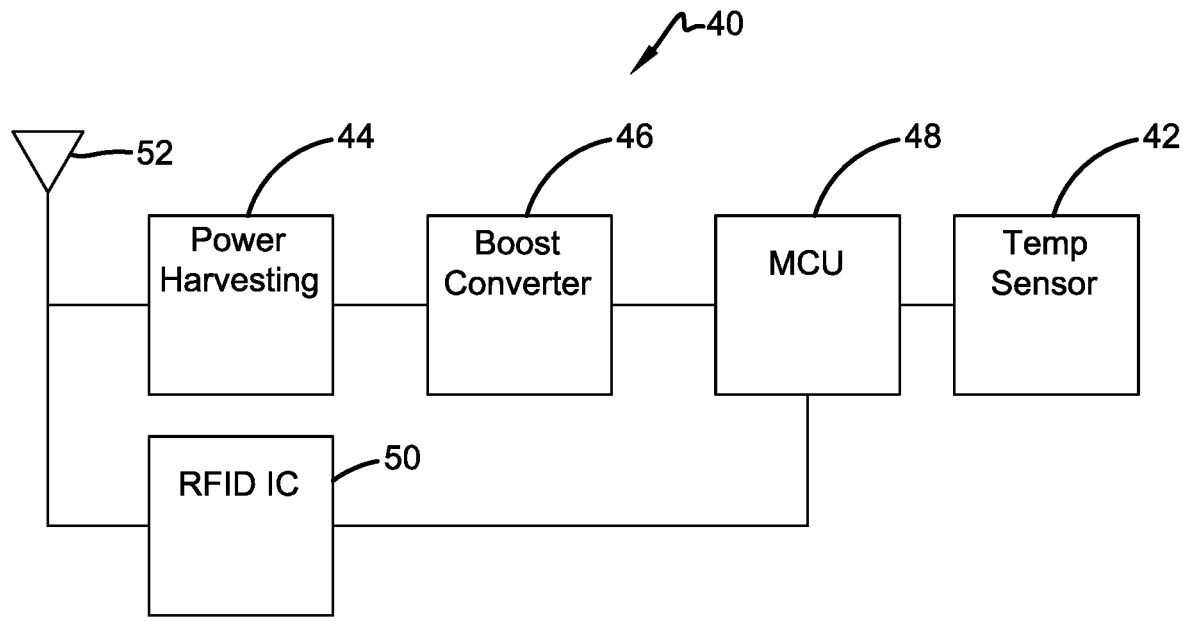
FIG. 3 is a block diagram of components of an integrated sensor unit.
Figure 4:
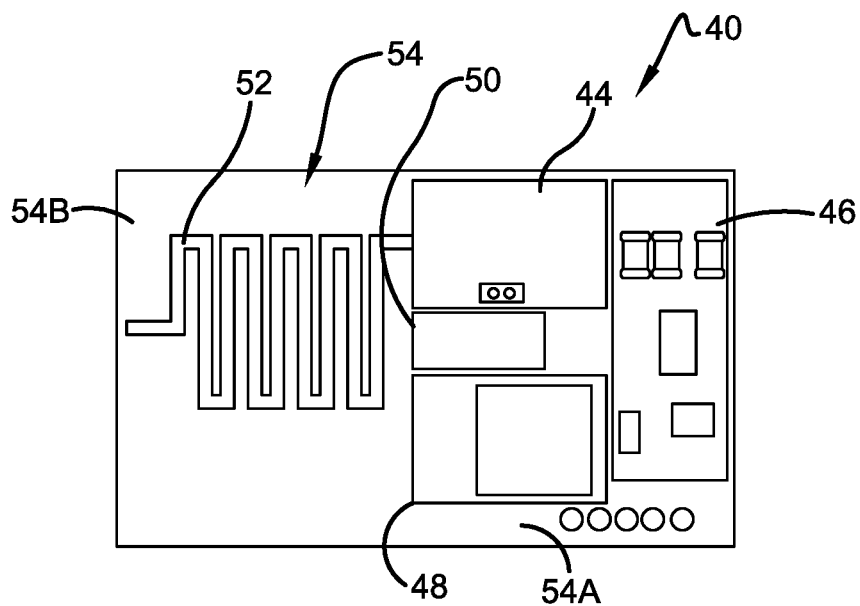
FIG. 4 is a plan view of the integrated sensor unit shown in FIG. 3.

With reference to FIGS. 3 and 4, a prior art sensor unit 40 that may be embedded in the structure of the tire 10 (FIG. 2) is shown. The prior art sensor unit 40 has been disposed between the belt package 32 and the tread 18, between the belt package and the carcass 20, or between belts 34, 36 and/or 38 within the belt package. The prior art sensor unit 40 includes a substrate 54 on which electronically interconnected components are formed.

For example, the prior art sensor unit 40 includes a temperature sensor 42 and a power source 44, such as an energy or power harvesting unit. A boost converter 46, which is a power converter that adjusts voltage and/or current between the power source 44 and the temperature sensor 42 and other powered components, is also included. A microcontroller unit (MCU) 48 receives the data from the temperature sensor 42 and processes it for transmission. A radio frequency identification (RFID) integrated circuit 50 includes information to identify the sensor unit 40.

An antenna 52 transmits data from the sensor unit 40 to an external reader and/or processor, as known to those skilled in the art. The antenna 52 may also receive signals to actuate the sensor unit 40, and may receive a radio frequency power signal for the power source 44.

The temperature sensor 42, the power source 44, the boost converter 46, the microcontroller unit 48 and the RFID integrated circuit typically are mounted on a first portion 54A of the substrate 54. The antenna 52 is mounted on a second portion 54B of the substrate 54 which is separate from and adjacent the first portion 54A of the substrate.

As mentioned above, the prior art sensor unit 40 has experienced disadvantages when embedded in the structure of the tire 10 prior to curing of the tire. Such prior art sensor units 40 often undesirably experience detachment or cracking of components and/or the substrate 54 during curing or operation of the tire 10 which shortens the life of the sensor unit.

Turning to FIGS. 5 through 8 an exemplary embodiment of an encapsulated sensor unit for a tire of the present invention is indicated at 100. The encapsulated sensor unit 100 may include the same components as the above-described sensor unit 40 (FIG. 4). More particularly, the encapsulated sensor unit 100 may include the temperature sensor 42, the power source 44, the boost converter 46, the microcontroller unit 48 and the RFID integrated circuit 50, which are mounted on the first portion 54A of the substrate 54 and shall be referred to as a sensor portion 102 of the encapsulated sensor unit. The encapsulated sensor unit 100 preferably also includes the antenna 52, which is mounted on the second portion 54B of the substrate 54 and shall be referred to as an antenna portion 104 of the encapsulated sensor unit.

Figure 5:
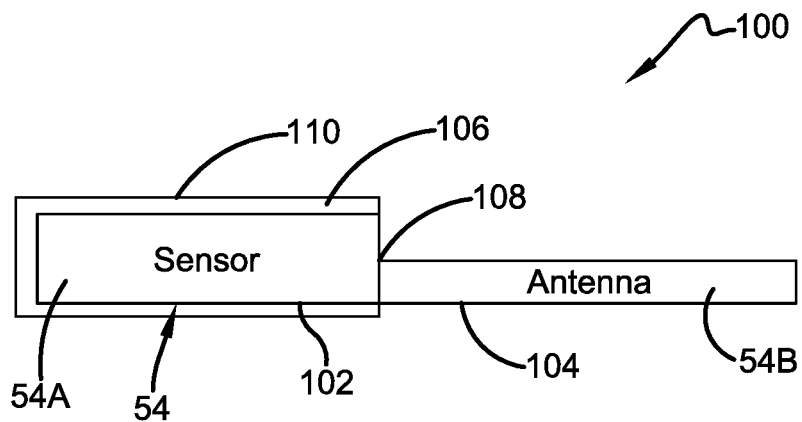
FIG. 5 is a cross-sectional view of an exemplary embodiment of a sensor unit for a tire of the present invention with a first encapsulation layer.

As shown in FIG. 5, a first encapsulation layer 106 is disposed about the sensor portion 102 of the encapsulated sensor unit 100. The first encapsulation layer 106 preferably surrounds the sensor portion 102, and terminates at a joint 108 between the sensor portion and the antenna portion 104. The first encapsulation layer 106 includes an exterior surface 110. Preferably, the first encapsulation layer 106 is of a thermosetting polymer, such as an epoxy resin. A thermosetting polymer enables the first encapsulation layer 106 to be poured and thus easily formed about the sensor portion 102, while hardening to form a strong layer that is still somewhat resilient. In this manner, the first encapsulating layer 106 protects and maintains the position of components such as the temperature sensor 42, the power source 44, the boost converter 46, the microcontroller unit 48 and the RFID integrated circuit 50.

As mentioned above, the first encapsulation layer 106 preferably terminates at the joint 108, and thus does not encapsulate the antenna portion 104. Because the antenna 52 is disposed in the antenna portion 104, radio signals must be transmitted to and from the antenna portion of the encapsulated sensor unit 100. The thermosetting polymer used to form the first encapsulation layer 106 may interfere with such transmission, and so does not encapsulate the antenna portion 104. In addition, the antenna 52 withstands greater flexing than the components mounted on the sensor portion 102, eliminating the need for encapsulation of the antenna portion 104 with a thermosetting polymer.

Figure 6:
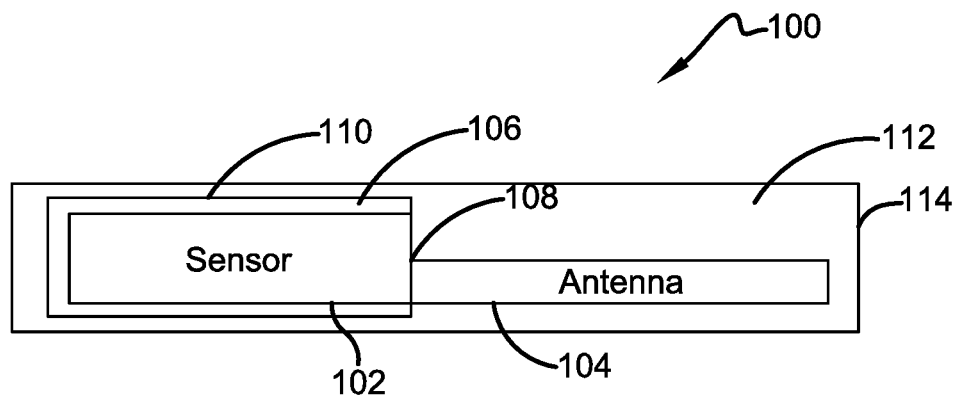
FIG. 6 is a schematic cross-sectional view of an exemplary embodiment of a sensor unit for a tire of the present invention with first and second encapsulation layers.

Turning to FIG. 6, disposed about the exterior surface 110 of the first encapsulating layer 106 and about the antenna portion 104 is a second encapsulating layer 112. The second encapsulation layer 112 thus surrounds the sensor portion 102 and the antenna portion 104, and includes an exterior surface 114. Preferably, the second encapsulation layer 112 is of a vulcanizing adhesive, which provides a strong bond with rubber. By way of example, one such vulcanizing adhesive is distributed under the name Chemlok, which is a registered trademark of Lord Corporation. By surrounding the first encapsulating layer 106, which is disposed about the sensor portion 102, and the antenna portion 104, the second encapsulating layer provides improved adhesion with a third encapsulating layer 116.

Figure 7:
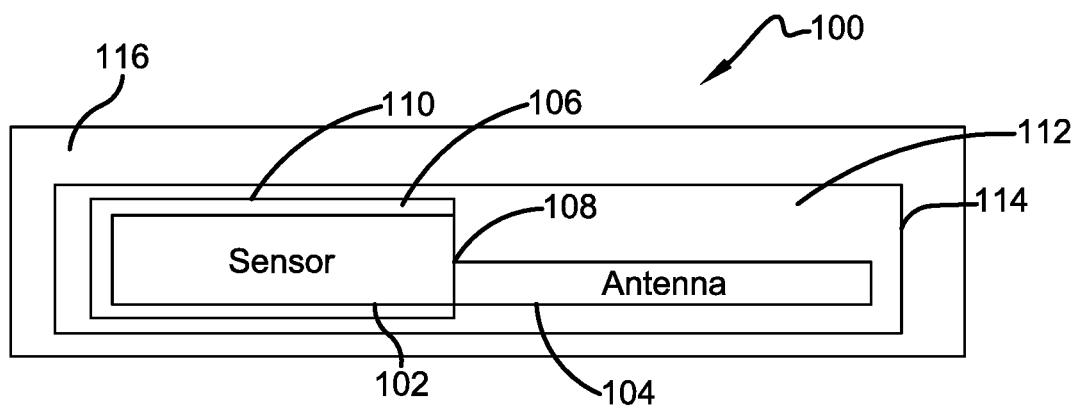
FIG. 7 is a schematic cross-sectional view of an exemplary embodiment of a sensor unit for a tire of the present invention with first, second and third encapsulation layers.

As shown in FIG. 7, the third encapsulation layer 116 is disposed about the exterior surface 114 of the second encapsulation layer 112. The third encapsulation layer 116 thus encapsulates both the sensor portion 102 and the antenna portion 104. Preferably, the third encapsulation layer 116 is of a soft gum rubber. By being formed of a soft rubber, the third encapsulation layer 116 acts as a cushion to protect the electronic components on the sensor portion 102 and the antenna 52 on the antenna portion 104 from high stresses. In addition, the soft rubber of the third encapsulation layer 116 enables the encapsulated sensor unit 100 to bond with the rubber components of the tire structure during curing of the tire.

Moreover, the soft rubber of the third encapsulation layer 116 preferably is of a type that allows radio frequency signals and/or wireless power signals to pass through it, which enables efficient signal and/or energy transmission to and from the antenna 52 disposed in the antenna portion 104 of the encapsulated sensor unit 100. Such signal transmission enables the encapsulated sensor unit 100 to be a passive radio frequency unit that is actuated by an external reader. For example, the microcontroller unit 48, the RFID integrated circuit 50, and other components may remain in a passive state until an external reader is in proximity with the sensor unit 100. Due to such proximity, radio frequency signals pass through the soft rubber of the third encapsulation layer 116, enabling the antenna 52 to receive a signal from the reader, which actuates the microcontroller unit 48, the RFID integrated circuit 50 and other components. Likewise, data from the sensor components in the sensor portion 102 may be transmitted wirelessly through radio frequency by the antenna 52 through the third encapsulation layer 116 to the external reader.

Figure 8:
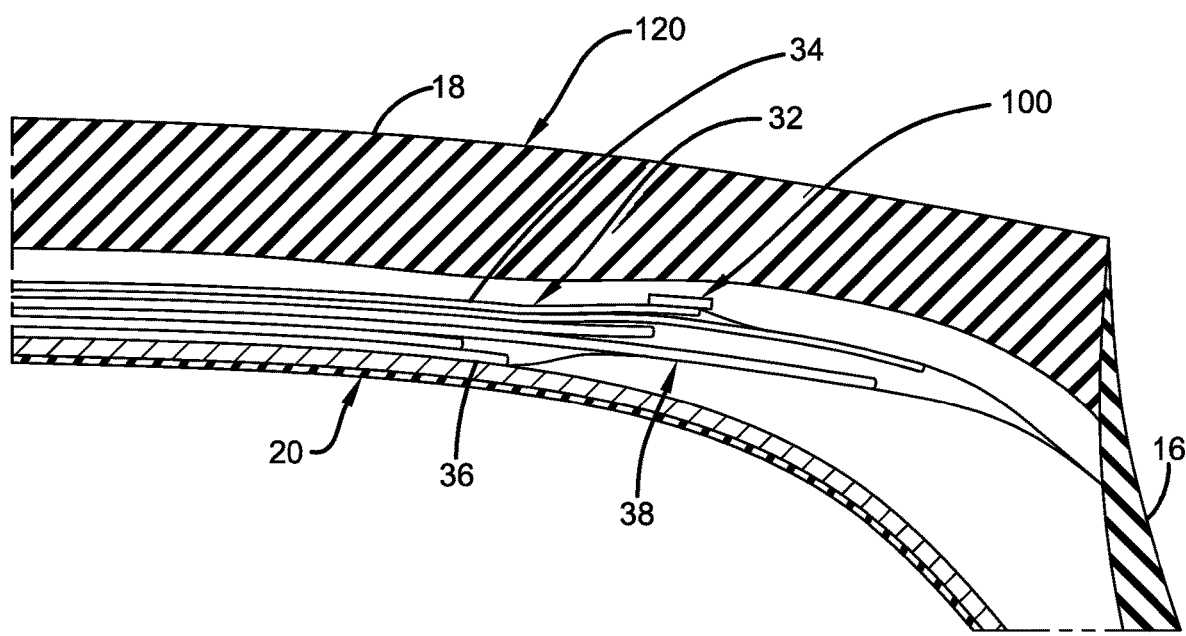
FIG. 8 is a schematic partial cross-sectional view of the construction of a tire with the encapsulated sensor unit shown in FIG. 7 embedded in the tire structure.

With particular reference now to FIG. 8, the above-described structure of the encapsulated sensor unit 100 enables the unit to be inserted into a specific structural location in a tire 120 before curing. As with the tire 10 shown in FIG. 1, the tire 120 includes a pair of bead areas 12 (FIG. 1), a bead core 14 embedded in each bead area, and sidewalls 16 extending radially outward from each respective bead area to a ground-engaging tread 18. The tire 120 is reinforced by a carcass 20, which toroidally extends from one bead area 12 to the other bead area, and a belt reinforcement package 32 is disposed between the carcass and the tread 18. The belt reinforcement package 32 may a radially outer belt structure 34 and a radially inner belt structure 36, and an intermediate belt structure 38 disposed between the radially outer belt structure and the radially inner belt structure.

When the encapsulated sensor unit 100 is inserted into the tire 120 before curing, the sensor unit 100 may be employed to detect temperature profiles within the tire during curing. In such a case, the encapsulated sensor unit 100 may be disposed in the last part of the tire 120 to cure, which is referred to as the point of least cure. By being located at the point of least cure in the tire 120, the sensor unit 100 may measure the actual integrated time and temperature history during the curing of the tire, which may be used to control the cycle time of the curing press. Such a measurement of actual temperature at the point of least cure of the tire 120 by the sensor unit 100 may be more reliable than prediction techniques. In addition, because prediction techniques often add more curing time as a precautionary factor, measurement of actual temperature with the sensor unit 100 may reduce the curing time that is required for the tire 120, thereby increasing the efficiency of the curing process.

Once the tire 120 is cured, the encapsulated sensor unit 100, and particularly the third encapsulation layer 116 (FIG. 7), bonds with the rubber compounds of the carcass 20, the belt reinforcement package 32 and/or the tread 18, depending on the specific placement or disposition of the sensor unit in the tire structure. In this manner, the encapsulated sensor unit 100 is permanently disposed at its selected location inside the tire 120. The encapsulated construction of the sensor unit 100, including the sensor portion 102 encapsulated by the first, second and third encapsulation layers 106, 112 and 116, and the antenna portion 104 encapsulated by the second and third encapsulation layers, enables bonding of the sensor unit to the structure of the tire 120 without damage to the tire.

The encapsulated sensor unit 100 may also be employed to detect temperature within the tire 120 during its use on a vehicle. For example, the sensor unit 100 may be disposed at the edge of the belt reinforcement package 32 to measure the belt edge temperature. Belt edge temperature is often an indicator of performance and/or life issues for the tire 120, and by detecting temperature in the structure at the edge of the belt reinforcement package 32, the encapsulated sensor unit 100 provides data indicating when tire replacement is recommended. The encapsulated sensor unit 100 may also track a temperature versus time history at a specific location, such as the belt edge or a belt splice, in order to provide data to predict when tire replacement should occur. Moreover, the encapsulated sensor unit 100 may be disposed in other structural areas of the tire 120 to monitor temperatures at those locations.

In this manner, the encapsulated sensor unit 100 provides a structure that may be embedded in a tire 120, and maintains durability of the tire and the life of the sensor unit. The encapsulated construction of the sensor unit 100 also bonds with the components of the tire 120 and thereby prevents structural issues within the tire.

The present invention also includes a method of forming a tire 120 with an encapsulated sensor unit 100. The method includes steps in accordance with the description that is presented above and shown in FIGS. 5 through 8.

It is to be understood that the structure of the above-described encapsulated sensor unit 100 and/or the tire 120 in which the sensor unit is embedded may be altered or rearranged, or components or steps known to those skilled in the art omitted or added, without affecting the overall concept or operation of the invention. For example, the encapsulated sensor unit 100 may be disposed in any location in the tire 120, more than one encapsulated sensor unit may be disposed in the tire, and electronic structures and/or types of sensors other than those described above may be connected to or integrated into the encapsulated sensor unit. In addition, the invention applies to any type of tires, including pneumatic tires, non-pneumatic tires, automotive tires, passenger tires, truck tires, commercial tires, off-the-road tires, aircraft tires, spacecraft tires, and the like.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An encapsulated sensor unit for embedding in a tire, the encapsulated sensor unit comprising:
   a sensor portion;
   an antenna portion;
   a first encapsulating layer disposed about and surrounding the sensor portion, the first encapsulating layer not surrounding the antenna portion;
   a second encapsulating layer disposed about and surrounding and encapsulating the first encapsulating layer and the antenna portion; and
   a third encapsulating layer disposed about and surrounding and encapsulating the second encapsulating layer.

2. The encapsulated sensor unit of claim 1, wherein the first encapsulation layer is of a thermosetting polymer.

3. The encapsulated sensor unit of claim 2, wherein the thermosetting polymer includes an epoxy resin.

4. The encapsulated sensor unit of claim 1, wherein the sensor portion includes at least one sensor.

5. The encapsulated sensor unit of claim 4, wherein the at least one sensor includes a temperature sensor.

6. The encapsulated sensor unit of claim 1, wherein the antenna portion includes an antenna for transmitting and receiving radio frequency signals.

7. The encapsulated sensor unit of claim 6, wherein the antenna receives a radio frequency power signal.

8. The encapsulated sensor unit of claim 1, wherein the second encapsulation layer is of a vulcanizing adhesive.

9. The encapsulated sensor unit of claim 1, wherein the third encapsulation layer is of a soft gum rubber.

10. The encapsulated sensor unit of claim 1, wherein the sensor portion includes at least one of a radio frequency identification integrated circuit, a microcontroller unit, a power source, and a boost converter.

11. A tire including an encapsulated sensor unit, the tire and encapsulated sensor unit combination comprising:
    the tire including:
       a pair of bead areas;
       a sidewall extending from each respective bead area to a tread;
       a carcass extending toroidally between each of the bead areas; and
       a belt reinforcement package disposed between the tread and the carcass; and
    the encapsulated sensor unit being embedded in the tire, the encapsulated sensor unit including:
       a sensor portion;
       an antenna portion;
       a first encapsulating layer disposed about and surrounding the sensor portion, the first encapsulating layer not surrounding the antenna portion;
       a second encapsulating layer disposed about and surrounding and encapsulating the first encapsulating layer and the antenna portion; and
       a third encapsulating layer disposed about and surrounding and encapsulating the second encapsulating layer.

12. The tire including an encapsulated sensor unit of claim 11, wherein the first encapsulation layer is of a thermosetting polymer.

13. The tire including an encapsulated sensor unit of claim 11, wherein the second encapsulation layer is of a vulcanizing adhesive.

14. The tire including an encapsulated sensor unit of claim 11, wherein the third encapsulation layer is of a soft gum rubber.

15. The tire including an encapsulated sensor unit of claim 11, wherein the at least one sensor includes a temperature sensor.

16. The tire including an encapsulated sensor unit of claim 11, wherein the encapsulated sensor unit is embedded between the tread and the belt reinforcement package or between the carcass and the belt reinforcement package.

17. The tire including an encapsulated sensor unit of claim 11, wherein the encapsulated sensor unit is disposed at an edge of the belt reinforcement package.

18. The tire including an encapsulated sensor unit of claim 11, wherein the encapsulated sensor unit is embedded between layers of the belt reinforcement package.

19. The tire including an encapsulated sensor unit of claim 11, wherein the encapsulated sensor unit is inserted into the tire before curing of the tire.

\* \* \* \* \*